US011223704B2

(12) United States Patent
Bar-Zeev et al.

(10) Patent No.: US 11,223,704 B2
(45) Date of Patent: *Jan. 11, 2022

(54) EVENT SERVICE FOR LOCAL CLIENT APPLICATIONS THROUGH LOCAL SERVER

(71) Applicant: Microsoft Technology Licensing, LLC, Redmond, WA (US)

(72) Inventors: Avi Bar-Zeev, Redmond, WA (US); Gur Kimchi, Bellevue, WA (US); Brian C. Beckman, Newcastle, WA (US); Scott Isaacs, Bellevue, WA (US); Meir Ben-Itay, Sammamish, WA (US); Eran Yariv, Zichron Yaakov (IL); Blaise Aguera y Arcas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/115,747

(22) Filed: Aug. 29, 2018

(65) Prior Publication Data

US 2019/0020733 A1 Jan. 17, 2019

Related U.S. Application Data

(63) Continuation of application No. 15/156,842, filed on May 17, 2016, now Pat. No. 10,542,122, which is a
(Continued)

(51) Int. Cl.
*G06F 9/46* (2006.01)
*H04L 29/06* (2006.01)
(Continued)

(52) U.S. Cl.
CPC ............ *H04L 67/42* (2013.01); *G06F 1/3203* (2013.01); *G06F 1/3215* (2013.01); *H04L 67/02* (2013.01); *H04L 67/32* (2013.01); *H04L 67/34* (2013.01)

(58) Field of Classification Search
CPC ........ H04L 67/02; H04L 67/32; H04L 67/34; G06F 1/3203; G06F 1/3215
See application file for complete search history.

(56) References Cited

U.S. PATENT DOCUMENTS 6,268,852 B1 * 7/2001 Lindhorst ................. G06F 8/34
715/234
8,762,759 B2 * 6/2014 Williams .............. G06F 1/3203
713/323
(Continued)

FOREIGN PATENT DOCUMENTS

CN 101005396 A 7/2007
CN 101110822 A 1/2008
(Continued)

OTHER PUBLICATIONS

"Stefan Tilkov, Steve Vinoski, Node.js: Using JavaScript to Build High-Performance Network Programs, Dec. 2010, IEEE Internet Computing, vol. 14, pp. 80-83" (Year: 2010).*
(Continued)

Primary Examiner — Tammy E Lee (57) ABSTRACT

In server/client architectures, the server application and client applications are often developed in different languages and execute in different environments specialized for the different contexts of each application (e.g., low-level, performant, platform-specialized, and stateless instructions on the server, and high-level, flexible, platform-agnostic, and stateful languages on the client) and are often executed on different devices. Convergence of these environments (e.g., server-side JavaScript using Node.js) enables the provision
(Continued)

of a server that services client applications executing on the same device. The local server may monitor local events occurring on the device, and may execute one or more server scripts associated with particular local events on behalf of local clients subscribing to the local event (e.g., via a subscription model). These techniques may enable development of local event services in the same language and environment as client applications, and the use of server-side code in the provision of local event service.

20 Claims, 8 Drawing Sheets

Related U.S. Application Data continuation of application No. 13/650,022, filed on Oct. 11, 2012, now Pat. No. 9,363,334.

(60) Provisional application No. 61/546,049, filed on Oct. 11, 2011.

(51) Int. Cl.
  *G06F 1/3215* (2019.01)
  *H04L 29/08* (2006.01)
  *G06F 1/3203* (2019.01)

(56) References Cited

U.S. PATENT DOCUMENTS

| | | | |
|---|---|---|---|
| 2004/0133639 | A1 | 7/2004 | Shuang et al. |
| 2005/0015472 | A1 | 1/2005 | Catania et al. |
| 2008/0178162 | A1 | 7/2008 | Sanford et al. |
| 2011/0265179 | A1* | 10/2011 | Newman .............. G06F 21/604 726/22 |
| 2012/0047519 | A1* | 2/2012 | Mebane, III ............ G06F 8/315 719/318 |
| 2013/0212183 | A1* | 8/2013 | Ward ...................... G06F 9/541 709/206 |

FOREIGN PATENT DOCUMENTS

| | | |
|---|---|---|
| CN | 101309165 A | 11/2008 |
| CN | 201210690 Y | 3/2009 |
| CN | 101789971 A | 7/2010 |
| CN | 101855883 A | 10/2010 |
| CN | 101960449 A | 1/2011 |
| EP | 1368734 A2 | 12/2003 |

OTHER PUBLICATIONS

"Final Office Action Issued in U.S. Appl. No. 13/873,779", dated Jun. 27, 2019, 29 Pages.
"Office Action Issued in Korean patent Application No. 10-2014-7027267", dated May 29, 2109, 12 Pages.
Schmidt, Douglas C.., "Asynchronous Completion Token", In Book of Pattern languages of program design 3, Nov. 1999, 16 Pages.
"Office Action Issued in Indian Patent Application No. 2434/CHENP/2014", dated Feb. 4, 2020, 7 Pages.
"Office Action Issued in European Patent Application No. 12839717.1", dated Feb. 25, 2020, 5 Pages.
"Office Action Issued in Brazilian Patent Application No. BR112014008762-8", dated Dec. 4, 2019, 5 Pages.
"Notice of Allowance Issued in Korean Patent Application No. 10-2014-7009554", dated Dec. 27, 2018, 5 Pages.
"Office Action Issued in European Application No. 12839717.1", dated Jan. 18, 2019, 5 Pages.
"Non Final Office Action Issued in U.S. Appl. No. 13/873,779", dated Dec. 3, 2018, 27 Pages.
"Office Action Issued in Canadian Patent Application No. 2,851,514", dated Feb. 19, 2019, 3 Pages.
"Non Final Office Action Issued in U.S. Appl. No. 15/433,034", dated Apr. 3, 2019, 16 Pages.
"Office Action Issued in European Patent Application No. 12839717.1", dated Aug. 12, 2019, 6 Pages.
"Office Action Issued in European Patent Application No. 12839717.1", dated Jun. 23, 2020, 4 Pages.
"First Office Action and Search Report Issued in Chinese Patent Application No. 201710332812.X", dated Mar. 26, 2020, 24 Pages.
"Second Office Action Issued in Chinese Patent Application No. 201710332812.X", dated Sep. 8, 2020, 11 Pages.
"Data compression", Retrieved from: https://en.wikipedia.org/w/index.php?title=Datacompression&oldid=504121177, Jul. 25, 2012, 11 Pages.
"Virtualization", Retrieved from: https://en.wikipedia.org/w/index.php?title=Virtualization&oldid=502940611, Jul. 18, 2012, 6 Pages.
"Extended Search Report Issued in European Patent Application No. 20182481.0", dated Feb. 2, 2021, 13 Pages.
"Office Action Issued in European Application No. 12839717.1", dated Jan. 12, 2021, 5 Pages.
"Notice of Allowance and Search Report Issued in Chinese Patent Application No. 201710332812.X", dated Dec. 4, 2020, 8 Pages.
Xiaoping, et al., "Content based publish subscribe system Routing Algorithm", In Chinese Journal of Electronics, May 15, 2008, pp. 953-961.
"Non Final Office Action Issued in U.S. Appl. No. 13/873,779", dated Jun. 21, 2021, 14 Pages.

* cited by examiner

EVENT SERVICE FOR LOCAL CLIENT APPLICATIONS THROUGH LOCAL SERVER

BACKGROUND

Within the field of computing, many scenarios involve a server-client architecture for enabling execution of an application on the client. As a first example, a webserver device may provide instructions and/or content comprising a web application to a second device for execution within a web browser. As a second example, an application store may provide instructions comprising a deployable local application that may execute entirely on a second device. As a third example, a database server may provide data to facilitate the execution of an application on a second device.

In view of these and other scenarios, the server/client architecture has led to specialized technologies executing on each device. In some cases, such specialization leads to directly opposite development in view of the different circumstances of the server and the client. For example, the server device often involves code specialized for the server context, such as concurrently executing applications on behalf of several clients; fulfilling requests in a performable and scalable matter (e.g., executing highly optimized code in order to expedite fulfillment of requests, and the reduction or elimination of reliance on a user interface); reducing stateful interactions, where the server stores data associated with a first transaction in order to fulfill a second transaction; and validating and isolating the execution contexts of requests received from different clients in order to reduce security vulnerabilities. Similarly, the client device often involves code specialized for the client context, such as the encoding of instructions in a platform-agnostic language that does not depend on a particular device configuration; the configuration of instructions to execute within a web browser; the provision of a robust user interface; and the storage of information on the client (e.g., in the form of cookies stored in a web browser cache) in order to persist information from a first transaction in furtherance of a second transaction. In these and other ways, the specialization of the server and client contexts has led to very different types of instructions executing on these different devices.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the divergent specialization of the server and client contexts has facilitated the performance of each type of device, such divergence causes various difficulties. As one such example, if the server executes one type of code (e.g., instructions that are particularly configured for the capabilities of the server) and the client executes a second type of code (e.g., flexible and platform-agnostic instructions that may execute equivalently on many devices), such differences may complicate the interoperative development of a server application and a client application due to differences in the languages, application programming interfaces (APIs), and data standards. Additionally, developers have to understand two different languages and execution environments, and techniques for converting data types and objects exchanged therebetween. As a result, recent developments have involved convergence in the development of these environments, such as the development and popularity of the Node.js model, involving server-side JavaScript code with language constructs and APIs specialized for the server context, thus enabling the development of server code and client code in the same language and sharing APIs and data types. However, such convergent server and client development environments are typically applied in the interaction of a server application executing on a server device and client applications executing on one or more client devices.

Presented herein are techniques for applying convergent server and client development environments for use on a single device. In particular, such techniques may enable a device to perform processing related to local events on behalf of a client application executing on the device, through a local server provided on the same device. For example, the device may execute a local server (such as a webserver) configured to monitor local device events, and to accept requests by client applications on the same device to subscribe to one or more local events. The local server may also associate one or more server scripts, and upon detecting an occurrence of a local event to which a client application is subscribed, the local server may execute the server script(s) associated with the local event on behalf of the local device.

For example, the local event may comprise a mobile event such as an incoming voice communication session, and a client application may request some particular processing for the voice communication session, such as recording the session. However, client applications executing on a mobile device may not be executing at the time of the incoming voice communication session, and thus may not be monitoring the occurrence of such a local event. Alternatively, the security model of a mobile device may ordinarily prohibit client applications from interacting with such local events as a security or quality-of-service measure (e.g., the local application may be executing within an isolation construct of the device, such as within a web browser). Rather, and according to the techniques presented herein, the client application may issue to a local server on the same device (executing continuously and outside of the web browser) a subscription request identifying the incoming voice communication session local event. Upon detecting such an event, the local server may execute one or more server scripts relating to the local event on behalf of the client application. Moreover, the server script may be designed in a similar development environment as the client application (e.g., both the server script and the local client application may be written in JavaScript, where the server script utilizes a Node.js server-side API), thus facilitating development of these interactive applications in a consistent and compatible manner. Such advantages may be achievable through the variations of the server/client architecture presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a server/client architecture, comprising a server application (e.g., a webserver) providing one or more services on behalf of one or more client applications. As a first example, the service many include the provision of web content, including web pages and web applications, to be rendered within a web browser of a client device. As a second example, the service may include an application store configured to store a set of applications executable on various devices, and to provide a particular device with one or more applications that may be executed thereupon. As a third example, the service may include the storage of data (e.g., in a database) and the provision of such data for use within various "data-driven" applications executing on respective client devices. In the traditional model, a server application runs as a resident process of a device to await a connection initiated by a client application, receives requests by the client application, and fulfills such requests in order to provide the service to the client application.

In many such scenarios, the server application executes on a server device, and the client application executes on one or more client devices. The devices may present different capabilities suitable for each role. For example, the client device may comprise a user-oriented device (e.g., a workstation, laptop, tablet, mobile phone, or other appliance) executing the client application on behalf of a user, and may be specialized for such interactions (e.g., including touch-capable input devices and high-quality display and sound components). By contrast, the server device may comprise a service-oriented device (e.g., a "headless" server component lacking a dedicated display component), and may be specialized for the satisfaction of service requests in a highly performant manner (e.g., having high-throughout processors, a large-capacity data cache, and abundant network resources). The server device may comprise several server devices interoperating in the manner of a server farm. That is, the client devices may be configured to provide an appealing user experience, while the server devices may be configured to expedite the handling of service requests and the reliability of such devices (e.g., through failover capabilities provided in a server farm).

In view of these and other considerations, the techniques for developing server applications have typically differed in several notable respects from techniques for developing client applications. As a first example, client applications are often devised to execute on a wide variety of client devices, and may therefore be developed in a platform-agnostic language (e.g., JavaScript, which is capable of executing within any web browser). By contrast, server applications are often developed using development techniques that are highly tuned and customized for the particular configuration of the server in order to promote performance. As a second example, client applications may be devised as "stateful," i.e., persisting some information about a first request issued by a client application to the server in order to provide context and continuity for a second request issued by the client application to the server device. For example, web browsers are often configured to store "cookies" on the user's machine to enable a server to identify the client device again later. By contrast, server applications are often devised in a "stateless" manner, whereby data stored about any particular first transaction is reduced in order to raise the scalability of the server application when fulfilling on behalf of many client applications.

Figure 1:
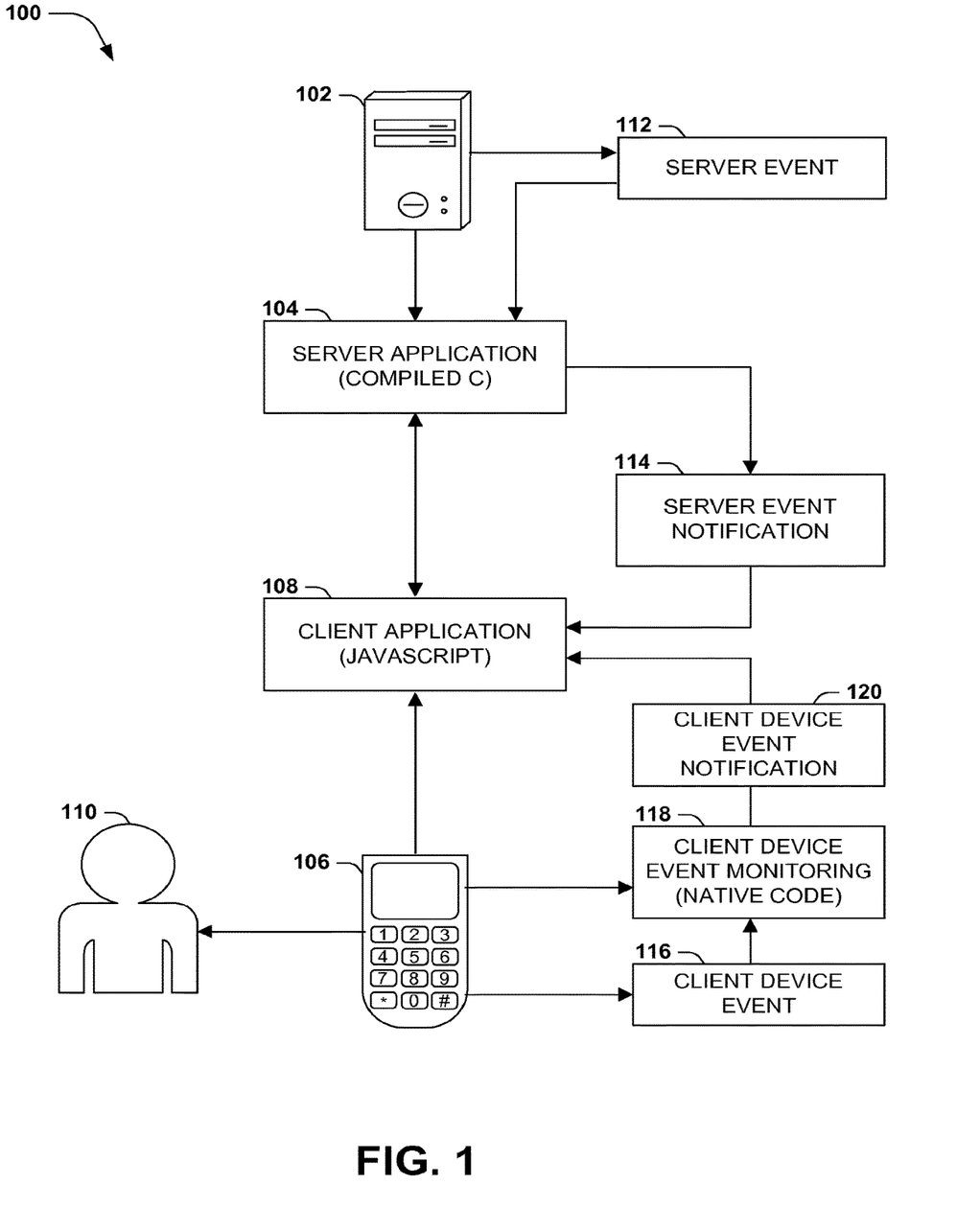
FIG. 1 is an illustration of an exemplary scenario illustrating a client/server architecture for fulfilling requests of client applications related to events arising on a client device and a server device.

FIG. 1 presents an illustration of an exemplary scenario 100 featuring an interaction of a server application 104 executing on a server device 102 and a client application 108 executing on a client device 106. The server device 102 may be connected to a network (e.g., the internet or a local area network (LAN)) and configured to await connection from one or more client applications 108. Upon such connection, the client application 108 may provide one or more requests to the server application 104, such as a request for web content, an application executable on the client device 106, or data utilized by a "data-driven" application. The server application 104 may fulfill such requests on behalf of the client application 108, and the client device 106 may present the results of such service to a user 110. In order to satisfy the different roles of these devices, the server application 104 is often particularly configured to utilize the particular capabilities of the server device 102. By contrast, the client application 108 is often provided in a high-level language, such as JavaScript, that may execute on a large variety of client devices 106 irrespective of the capabilities of the particular client device 106.

As a particular example, the server application 104 may be provided to notify client applications 108 and/or client devices 106 of server events 112 detected by the server device 102, such as the receipt of new data by the server device 102 or the monitoring of local environmental conditions (e.g., weather monitoring or images captured of an environment in which the server device 102 is positioned). The client application 108 may request notification of such server events 112, and upon detecting a server event 112, the server application 104 may send a server event notification 114 to the client application 108. Additionally, the client device 106 may monitor client device events 116, such as user input received from the user 110 or an input component, and may execute client device event monitoring 118 to detect and report such services. For example, the client device 106 may include a hardware driver that is configured to monitor hardware events and to provide client device event notifications 120 reporting such hardware events to client applications 108. In this manner, the server application 104 and the client application 108, executing in different roles and on different devices, may interoperate to inform the client application 108 of the server events 112 detected by the server application 104 and the client device events 116 detected by the client device event monitoring 118.

However, the architecture presented in the exemplary scenario 100 of FIG. 1 may present some disadvantages. In particular, the development of the server application 104 in view of the specialized properties of the server device 102 may significantly differ from the development of the client application 108 in a generalized manner language for a variety of devices. Due to the different development environments and languages, developers may have to understand both development environments and negotiate the differences for the interoperation of the server application 104 and the client application 108 (e.g., contending with differences in available application programming environments (APIs) and data format conversion). In order to reconcile such differences, more recent server application development models have converged with client application development to provide consistency in the development of such interoperating applications. As a first example, JavaScript has traditionally been regarded as inadequately performant for server applications, but the widespread familiarity with JavaScript among the development community has led to the development of Node.js, a JavaScript module providing server-side execution of JavaScript code. As a second example, techniques have been devised to enable servers to execute higher-level languages (such as JavaScript) in a more performant manner, e.g., by compiling JavaScript into native code that may execute faster on the server device 102. Developers may therefore use the same language and similar APIs to develop both server applications 104 and client applications 108. In view of such convergent technologies, techniques may be devised to utilize server-side code in new scenarios.

B. Presented Techniques

Presented herein is one such scenario, wherein a server application 104 may provide services related to client device events 116 associated with a client device 106. In particular, a server application 104 may execute on a device 106 to provide local event-related services to one or more client applications 108 executing on the same device. For example, a traditional webserver may execute passively but continuously on the client device 107, and may await requests for local event services initiated by one or more local client web applications executing within a web browser on the same client device 106. Such requests may include, e.g., notifying the client device 106 of local events, or applying some processing related to the local event on behalf of the client application 108. By enabling the server application 104 to monitor such client device events 116 and to apply execution to the device events 116, this model may offload this monitoring and computational burden from client applications 108, which may execute in a highly interactive, ad hoc manner at the request of the user 110 (e.g., monitoring and handling of client device events 116 may continue even after the client application 108 is terminated by the user 110). Additionally, this model may enable the interaction of the server application 104 with client device events 116 where such interactions may not be permitted by the client application 108. For example, the client application 108 may execute within a web browser that isolates the client application 108 from local client device events 116 for security reasons; however, the client application 108 may request the server application 104, executing outside the web browser and with a greater set of permitted capabilities, to interact with the client device events 116 in verifiable and trusted ways.

Figure 2:
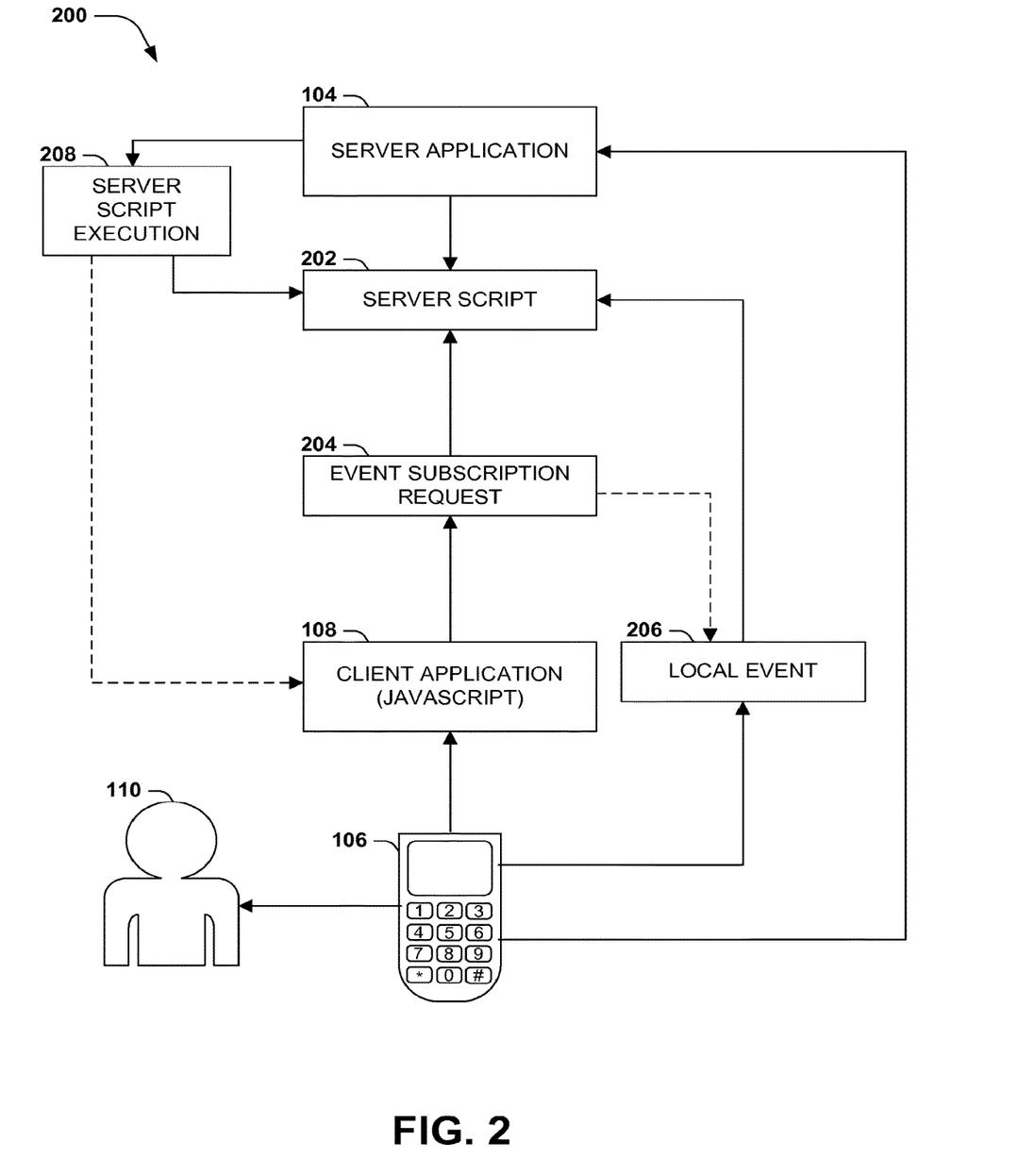
FIG. 2 is an illustration of an exemplary scenario illustrating a client/server architecture for fulfilling requests of client applications related to local events in accordance with the techniques presented herein.

FIG. 2 presents an illustration of an exemplary scenario 200 featuring a client/server architecture configured according to the techniques presented herein. In this exemplary scenario 200, the client device 106 executes both a server application 104 and one or more client applications 108, and may enable client applications 108 to interact with local events 206 through interaction with the client server application 104. In particular, the server application 104 may comprise one or more server scripts 202 that provide different types of processing when executed in the context of various local events 206. A client application 108 may present to the server application 104 an event subscription request 204 identifying one or more particular local events 206 that may arise within the client device 106. The server application 104 may fulfill the event subscription request 204 by associating one or more server scripts 202 with the local event 206, such that when such local events 206 occur, the server application 104 may perform server script execution 208 of the server scripts 202 on behalf of the subscribed client application 108.

The architectural model presented in the exemplary scenario 200 of FIG. 2 may enable various advantages with respect to other local event processing models. As a first example, this architecture may enables the server application 104 to perform the continuous background monitoring of the local events 206 and the execution of trusted server scripts 202 providing trusted processing of the local events 206, while the untrusted client application 104 may be executed intermittently and in an untrusted manner (e.g., within the isolation construct of a web browser). As a second example, providing one server application 104 to monitor a wide range of local events 206 and to apply processing thereto may be more efficient than configuring each of several client applications 108 to monitor the same set of local events 206. As a third example, the server scripts 202 may be developed in a similar development environment as the client applications 104 (e.g., the server script 202 may utilize the Node.js JavaScript server-side programming model, and the client application 104 may be developed as client-side JavaScript executing within the web browser of the client device 102). For example, the local events 206 may include events that client applications 104 are often not permitted to process directly, such as low-level hardware events or events arising within different processes of the client device 102 from which the client application 104 is prohibited from interacting. As a fourth example, by processing information on the same user device rather than sending the information as an invocation of a service on a remote device, these techniques promote the isolation of information that the user may not wish to disseminate, such as information that is personal to the user (e.g., the user's identity and location) and/or security information (e.g., passwords). As a fifth example, the programming scenario of applications to be executed by a server in service of client applications executing on the same device may provide a novel computing scenario, and may enable the development of a new market around such applications. These and other advantages may be achievable through the architecture illustrated in the exemplary scenario 200 of FIG. 2 and techniques presented herein.

C. Exemplary Embodiments

Figure 3:
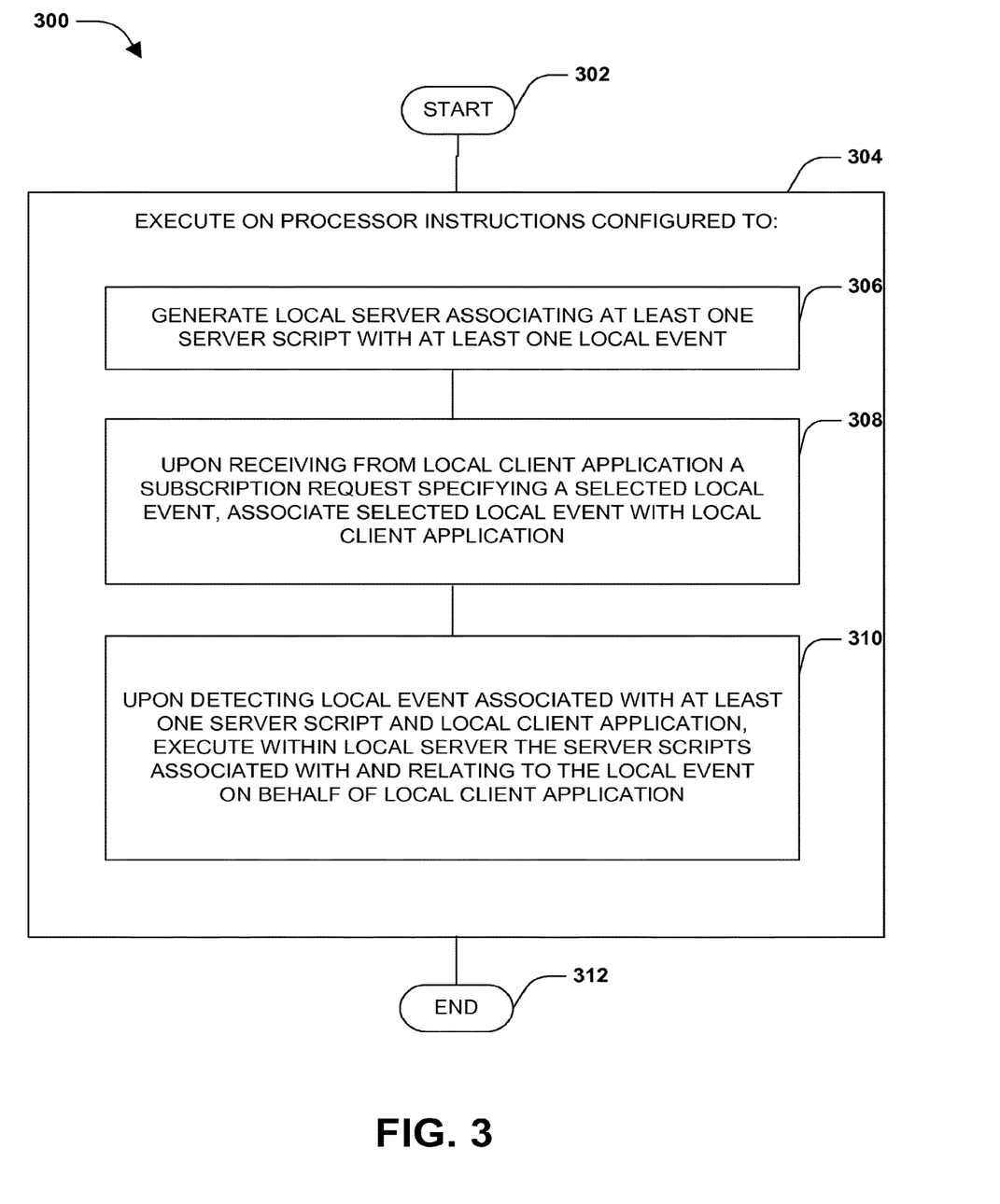
FIG. 3 is an illustration of an exemplary method of configuring a device to fulfilling requests of client applications related to local events in accordance with the techniques presented herein.

FIG. 3 presents a first exemplary embodiment of the techniques presented herein, illustrated as an exemplary method 300 of fulfilling requests on a device having a processor and executing at least one local client application 108. The exemplary method 300 may be implemented, e.g., as a set of instructions stored in a memory component of the device, such as a memory circuit, a platter of a hard disk drive, a solid-state storage device, or a magnetic or optical disc, and organized such that, when executed the device, cause the device to operate according to the techniques presented herein. The exemplary method 300 begins at 302 and involves executing 304 the instructions on a processor of the device. Specifically, these instructions may be configured to generate 306 a local server associating at least one server script 202 with at least one local event 206 that may arise on the device. The instructions are also configured to, upon receiving from a local client application 108 an event subscription request 204 specifying a selected local event 206, associate 308 the selected local event 206 with the local client application 108. The instructions are also configured to, upon detecting a local event associated with at least one server script 202 and a local client application 108, execute 310 within the local server the server scripts 202 associated with and relating to the local event 206 on behalf of the local client application 108. Having achieved the processing of the local event 206 on behalf of the local client application 108 through the use of a local server executing on the same device, the exemplary method 300 achieves the techniques presented herein, and so ends at 312.

Figure 4:
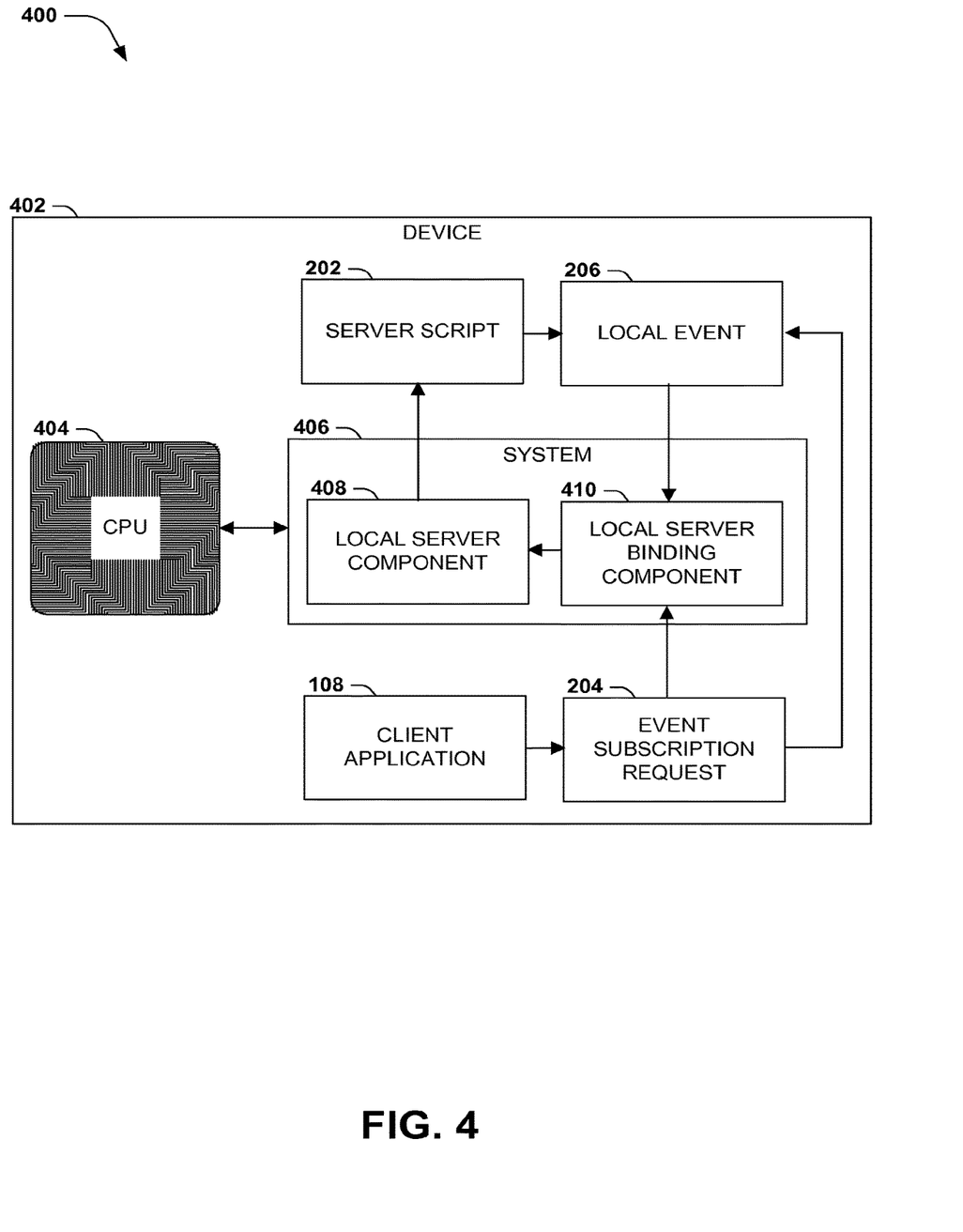
FIG. 4 is a component block diagram illustrating an exemplary system for fulfilling requests of client applications related to local events in accordance with the techniques presented herein.

FIG. 4 presents a second exemplary embodiment of the techniques presented herein, illustrated as an exemplary scenario 400 featuring an exemplary system 406 configured to fulfill requests on a device 402 having a processor 404 executing at least one local client application 108. The exemplary system 406 may be implemented, e.g., as instructions stored in a memory component of the device 402 and configured to, when executed on the processor 404, cause the device 402 to operate according to the techniques presented herein. The exemplary system 406 comprises a local server component 408 configured to associate at least one server script 202 with at least one local event 206. The exemplary system 406 also comprises a local server binding component 410, which is configured to, upon receiving from the client application 108 an event subscription request 204 specifying a selected local event 206, associate the selected local event 206 with the local client application 108; and, upon detecting a local event 206 associated with at least one server script 202 and a client application 108, execute within the local server component 408 the server scripts 202 associated with and relating to the local event 206 on behalf of the client application 108. By monitoring the occurrence of local events 206 and executing server scripts 202 in response to the local events 206 on behalf of the client application 108, the exemplary system 406 achieves within the device 402 the application of the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
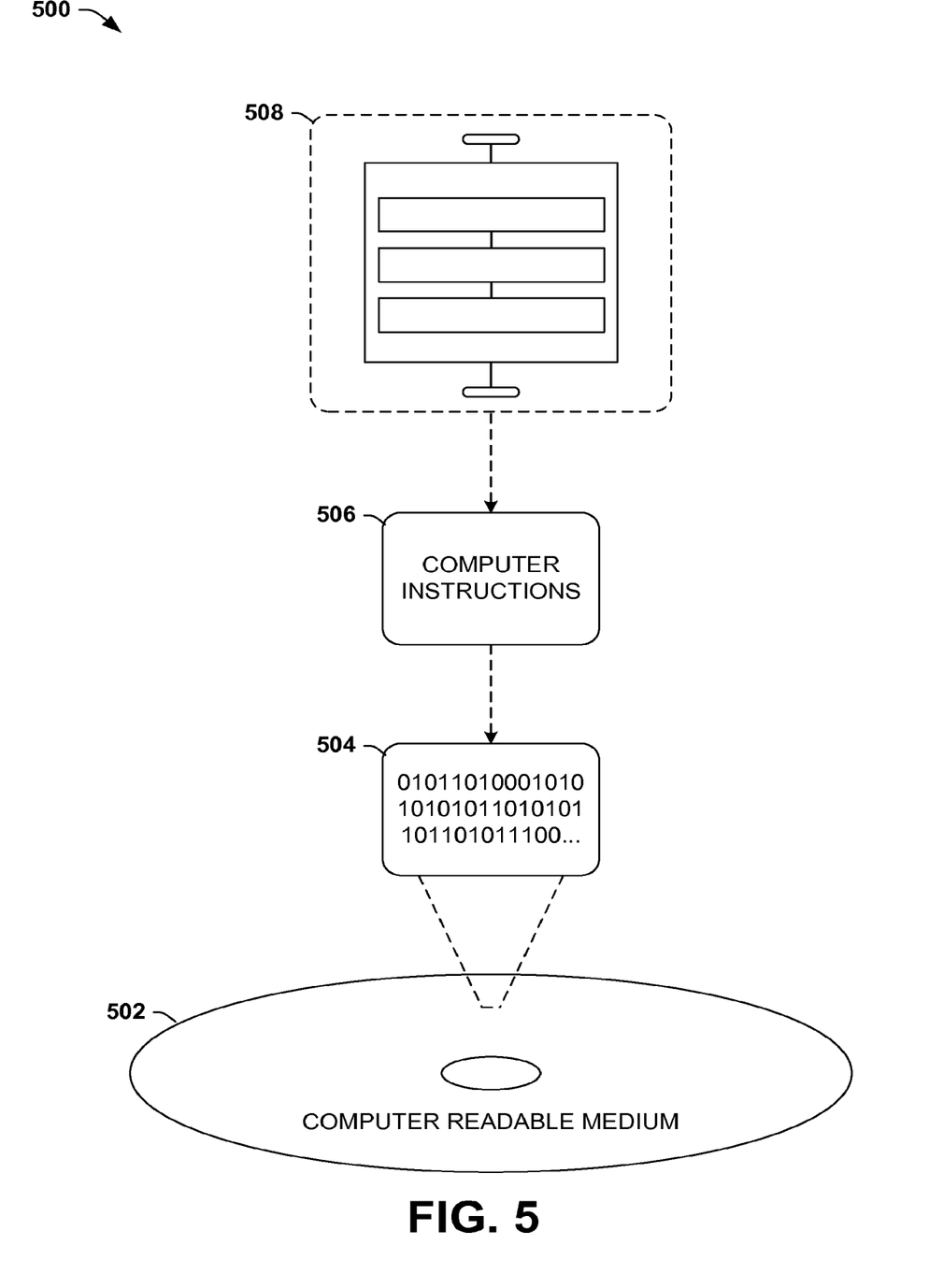
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In one such embodiment, the processor-executable instructions 506 may be configured to perform a method 508 of fulfilling requests of client applications 108 related to local events 105, such as the exemplary method 300 of FIG. 3. In another such embodiment, the processor-executable instructions 506 may be configured to implement a system for fulfilling requests of client applications 108 related to local events 206, such as the exemplary system 406 of FIG. 4. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3 and the exemplary system 406 of FIG. 4) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of device 402, such as servers, server farms, workstations, laptops, tablets, mobile phones, game consoles, and network appliances. Such devices 402 may also provide a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components.

As a second variation of this first aspect, the techniques presented herein may be utilized with various types of server applications 104, such as webservers, file servers, application servers, media servers, peer-to-peer sharing coordination servers, database servers, email servers, physical metric monitoring servers, and supervisory control and data acquisition (SCADA) automation servers.

As a third variation of this first aspect, the techniques presented herein may be utilized to service many types of client applications 108, such as web browsers, file-sharing applications, media rendering applications, and data-driven client applications. Moreover, the client applications 108 may execute in various contexts, such as native execution on the device 402; managed execution facilitated by one or more managing runtimes; virtual execution within a virtual environment, such as a web application executing within a web browser; and isolated execution within an isolation construct. Such client applications 108 may also be received by the device 402 through various techniques, such as client applications 108 bundled with the device 402; client applications retrieved from various services, such as an application server provided by the network; content embedded in a web page; a hardware or software driver provided by a component of the device 402; or a client application 108 provided by the server application 104. These and other scenarios may be compatible with and may advantageously utilize the techniques presented herein.

D2. Local Event and Server Script Types

A second aspect that may vary among embodiments of the techniques presented herein involves the types of local events 206 that may be monitored by the server application 104, and the types of server scripts 202 that the server application 104 may execute on behalf of one or more client applications 108 upon the occurrence of such local events 206.

As a first variation of this second aspect, the techniques presented herein may pertain to the monitoring of many types of local events 206 on the device 402, such as local input events involving a receipt of local input by an input component of the device 402; a local user event indicating a detection of the presence of, identity of, or an interaction received from a local user by a detector component of the device; a local processing event indicating a completion of a local data processing instance by the device; or an event subscription request 204 directed to the server application 104 by a client application 108. As one such example, the local event 206 may comprise a local application event arising during execution of a third application on the device 402 (other than the server application 104 and the client application 108), such as a hardware driver, an operating system component, another server application 104, or another client application 108. The server application 104 may therefore monitor the execution of the third application on the device 402 to detect the occurrence of the local application event (e.g., an instantiation of the third application; a suspension, completion, or termination of the third application; or a logical exception arising within the third application), and may execute one or more server scripts 202 associated with the local application event. Moreover, the third application may define one or more application-specific events that are custom to the third application, and the server application 104 may associate one or more server scripts 202 with the application-specific events for execution on behalf of another client application 108.

As a second variation of this second aspect, the server scripts 202 may specify many types of processing relating to the local event 206, such as reporting the local event 206 to the client application 108, logging the occurrence of the local event 206, or applying additional logic during the handling of the local event 206. Additionally, the server scripts 202 may be received from many sources; e.g., the server script 202 may be included with the server application 104, may be provided by a user 110, may be provided with and/or automatically generated by the device 402, or may be received from the client application 108 or an outside source. Moreover, the server application 104 may be configured to notify the client application 108 upon completion of the server script 202. For example, the event subscription request 204 provided by the client application 108 may specify an application callback to be invoked upon detecting the local event 206 and/or upon completing execution of the server script(s) 202 associated with the local event 206.

As a third variation of this second aspect, the techniques presented herein may involve the execution of many types of server scripts 202. As a first example of this third variation, such server scripts 202 may be designed using a variety of technologies, including server-side JavaScript invoking a Node.js module and to be executed by a local webserver.

As a second example of this third variation, the server script 202 may involve a blocking request that may interrupt operation of a process of the device 402. For example, the server script 202 may involve complex logic that involves lengthy computation, or may involve access to data or resources that are currently exclusively utilized by another process. Such blocking requests may be unsustainable in a client application 108 (e.g., a web application that issues a blocking request may be temporarily or indefinitely suspended, thus interrupting the user interface and/or a web browser containing the web application, and/or may exceed a processing timeout threshold resulting in termination of the web application). Instead, the client application 108 may delegate such blocking requests to the server application 104, wherein the server script 202 specifies the blocking request and/or logic to be executed after the blocking request. The server application 104 executing in the background may sustainably execute such blocking requests as a blockable thread without interrupting any foreground process of the device 402, and/or may acceptably continue to process the blocking request (e.g., awaiting completion of the long-running process or availability of resources) for an extended duration.

As a third example of this third variation, the server script 202 may specify a server script callback to be invoked upon achieving completion of the asynchronous process. The server script callback may be specified by the server script 202, by the server application 104, by the user 110, and/or by the client application 108. As one such example, the subscription request of the client application 108 may be associated with a client user interface event (e.g., the client application 108 may await some form of input from the user 110), and the client application 108 may specify an application callback to be invoked upon detection of the input. Upon receiving the subscription request 204, the server application 108 may configure or generate a server script 202 to invoke the application callback of the client application 108, and may associate the server script 202 with the local event 206 involving the detection of the user input. The device 402 may the continue execution of the client application 108, including a client user interface event presented therein, thus enabling the client application 108 to be notified of the detection of the user input event without having to monitor (e.g., via polling) input components for such detection. These and other types of local events 206 and/or server scripts 202 may be involved in the server/client architecture and techniques presented herein.

D3. Server Script Subscription and Execution

A third aspect that may vary among embodiments of these techniques involves the manner whereby the server application 108 accepts subscription requests 204 from respective client applications 108 and/or executes the server script(s) 202 associated with a local event 206 on behalf of one or more client applications 108.

As a first variation of this third aspect, the server application 104 may facilitate the subscription of client applications 108 to local events 206 by providing information about the available local events 206 to which the client applications 108 may subscribe. For example, upon receiving from the client application 108 a request to identify the set of subscribable local events 206, the server application 104 may enumerate the local events 206 subscribable by the client application 108. Alternatively, the server application 104 may simply maintain a directory of subscribable local events 206 queryable by the client applications 108.

As a second variation of this third aspect, the local server application 104 may identify subscribable local events 206 in many ways. As one such example, respective local events 206 may be associated with a local event address, e.g., a hypertext transport protocol (HTTP) address through which client applications 108 may request resources from the local server application 104. Upon receiving a client request specifying a particular address, the local server application 104 may determine whether the address is a local event address that is associated with a subscription request for a local event 206, and if so, may handle the client request as an event subscription request 204 initiated by the local client application 108. As a further such example, respective components of the device 402 may be identified by a local event address including a component name of the component, and the local client applications 108 may subscribe to local events 206 involving such components by initiating a client request specifying a local event address including the component name of the component.

Figure 6:
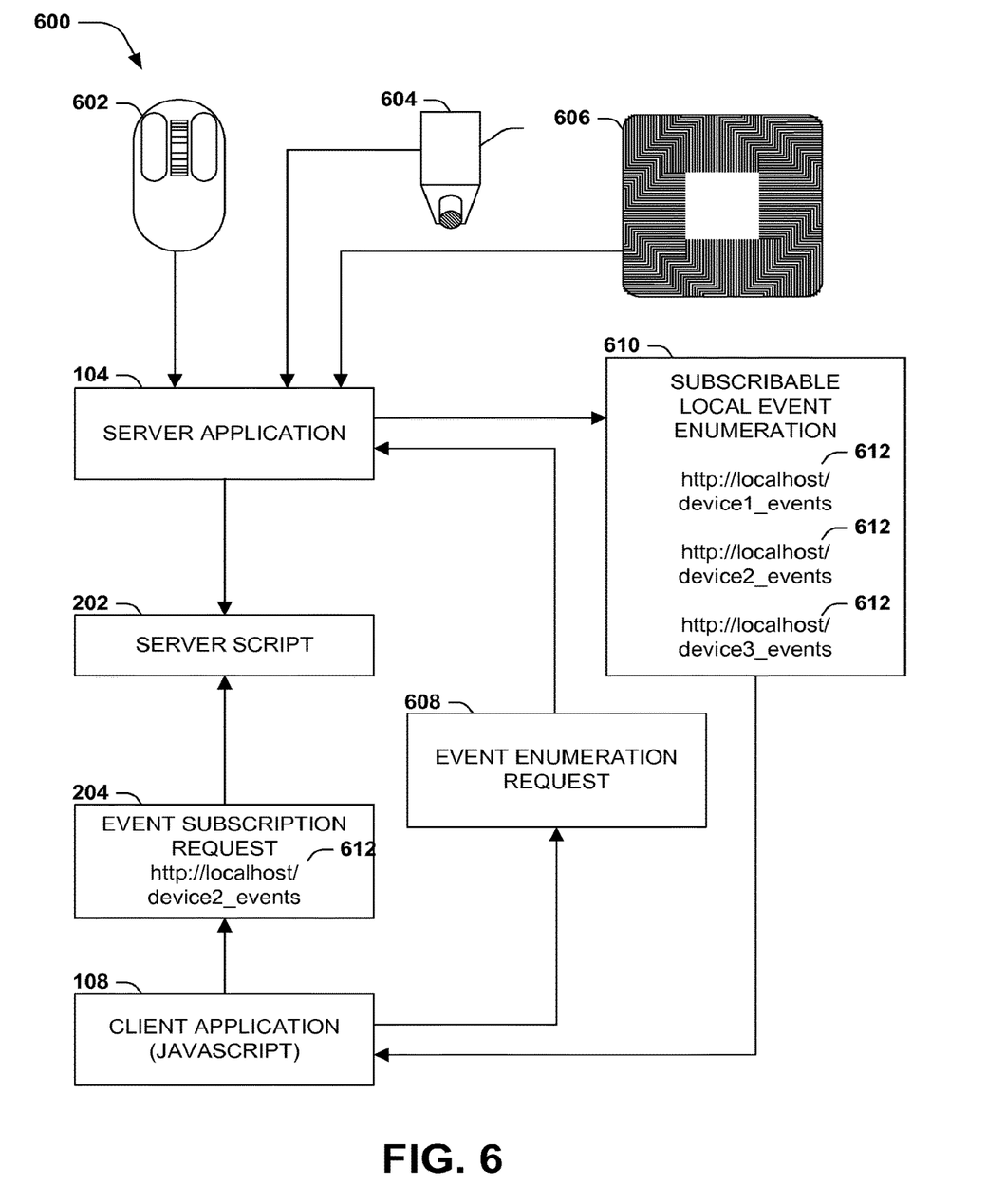
FIG. 6 is an illustration of an exemplary scenario featuring an event subscription model enabling local applications to subscribe to local events generated by components of the device, respective components identified by a component address.

FIG. 6 presents an illustration of an exemplary scenario 600 featuring several of these variations of the techniques presented herein. In this exemplary scenario 600, the device 402 comprises a set of components that may generate local events 206 to which one or more local client applications 108 may subscribe, such as a mouse component 602 operable by a user 110 to generate pointer input; a camera component 604 operable by a user 110 to capture still or motion images; and a processor component 606 configured to perform specialized types of processing (e.g., a ray-traced graphics processor). The device 402 may utilize a local server application 104 to fulfill such event subscription requests 204 by associating with respective components with a component address 612. A client application 108 may send to the local server application 104 an event enumeration request 608 (e.g., a request for the local server application 104 to enumerate the types of local events 206 to which the local client application 108 may subscribe, including the components that are accessible to the local client application 108), and the local server application 104 may respond with a subscribable event numeration 610 identifying, for respective components, a component address 612 that the local client application 108 may specify to subscribe to local events 206 generated by the component. If the local client application 108 sends to the server application 104 an event subscription request 204 specifying the component address 614 of a component, the local server application 104 may then associate the local application 108 with the local events 206 generated by the component, and, upon detecting such a local event 206, may execute a server script 202 associated with and related to the local event 206 generated by the component of the device 402. In this manner, the local server application 104 may enable and mediate the interaction of the local client applications 108 with the components of the device 402.

As a third variation of this third aspect, in addition to providing a local server application 104 providing local event subscription services to one or more local client applications 108, the device 402 may also include other applications executing on other devices 402 (e.g., extending the local service model provided herein to also include traditional, multi-device server/client architectures). As a first such example, the device 402 may enable local client applications 108 to target subscription requests either to a local server application 104 or to a remote server application executing on a remote device. Upon determining that the target of an event subscription request 204 of a local client application 108 is the local server application 104, the device 402 may present the event subscription request 204 to the local server application 104; but upon determining that the target of the event subscription request 204 comprises a remote server application of a remote device, the device 402 may forward the subscription request 204 to the remote device. Alternatively or additionally, in addition to receiving and servicing event subscription requests 204 provided by local client applications 108, the local server application 104 may receive event subscription requests 204 received from remote client applications of executing on a second device, and may fulfill such event subscription requests 204 by, upon detecting a local event 206 to which a remote application is subscribed, executing one or more server script(s) 202 associated with and related to the local event 206 on behalf of the remote client application executing on the second device. As one such example, it may be highly advantageous to providing local server applications 104 on each of set of devices interoperating as a device mesh, where each local server application 104 is configured to service event subscription requests 204 to local events 206 on behalf of local client applications 108 executing locally on the same device 402 as well as remote client applications executing on other devices 402 of the device mesh.

Figure 7:
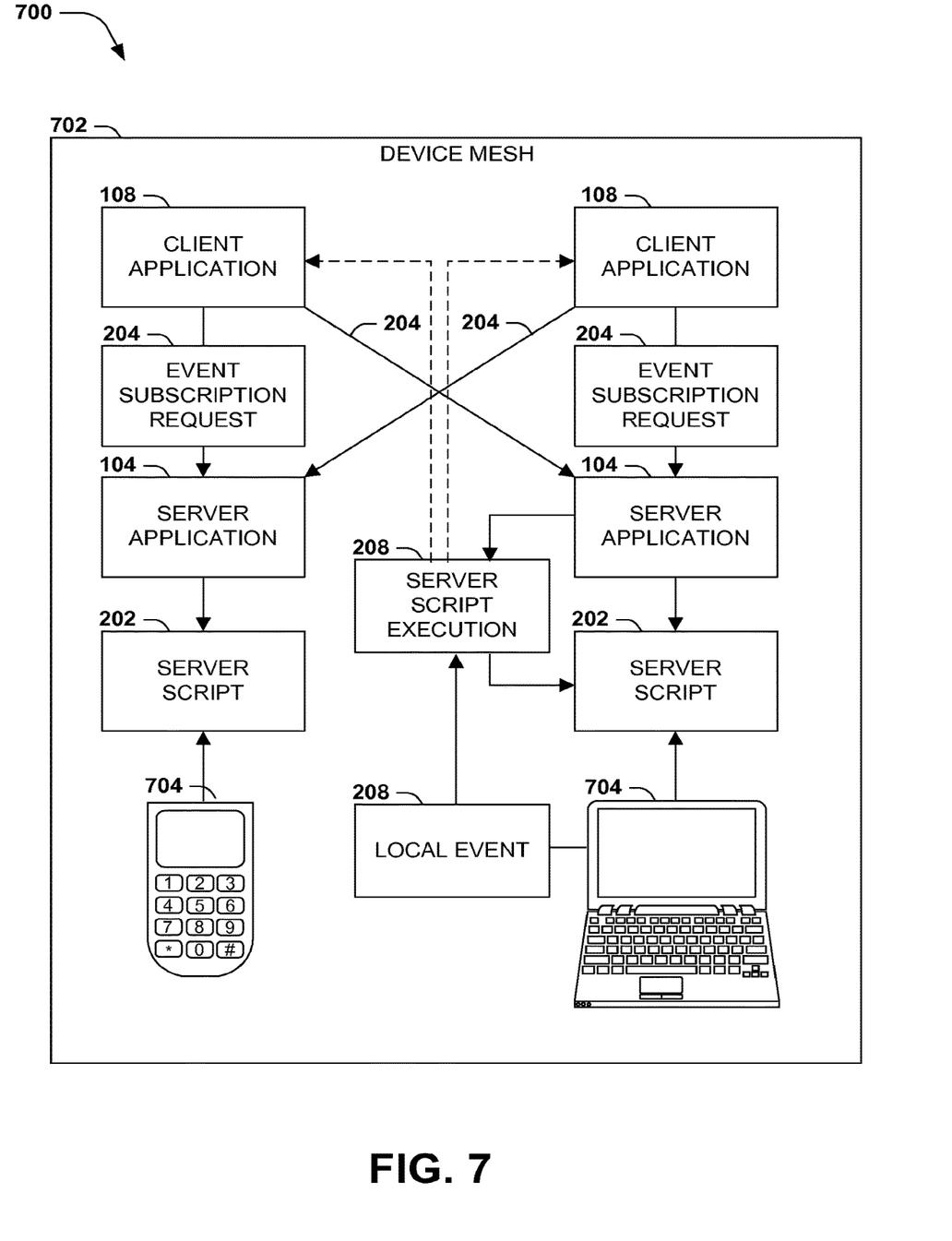
FIG. 7 is an illustration of an exemplary scenario featuring a device mesh comprising a set of devices respectively executing a local server configured to receive and fulfill event subscription requests received from both local client applications and remote client applications executing on other devices of the device mesh.

FIG. 7 presents an illustration of an exemplary scenario 700 featuring the interoperation of several devices 704 comprising a device mesh 702 according to the techniques presented herein. In this exemplary scenario 700, respective devices 704 of the device mesh 702 may intercommunicate (e.g., through a wired or wireless network) to share information about the local events 206 arising within each device 704. To this end, each device 704 may comprise a server application 104 configured to receive and fulfill event subscription requests 204 provided not only by the local client applications 108 executing on the same device 704, but also remote client applications executing on another device 704 of the device mesh 702. Additionally, upon a first device 704 receiving an event subscription request 204 from a local client application 108 specifying as the target of the request a remote server application executing on a second device 704 of the device mesh 702, the first device 704 may forward the event subscription request 204 to the second device. Upon detecting the occurrence of a local event 206, the server application 104 may identify the local client applications 108 and the remote client applications executing on other devices 704, and may initiate server script execution 208 of one or more server scripts 202 associated with the local event 206 on behalf of each such subscribed client application 108. This variation therefore extends the local event service model presented herein to include other client applications 106 executing on other devices 704 in accordance with the techniques presented herein.

As a fourth variation of this third aspect, the device 402 may adjust the execution of the local server application 104 and/or the local client application(s) 108 in a manner that conserves the resources of the device 402, such as a mobile device operating a limited-capacity battery and/or within low wattage power constraints, or a processor that yields higher device performance if processing and/or memory are conserved.

As a first example of this fourth variation, the local server application 108 may be executed only when event subscription requests 204 are pending from one or more client applications 108. For example, upon receiving an event subscription request 204, the device 402 may determine whether the local server application 104 is executing, and if not, may invoke execution of the local server application 104 in order to fulfill the event subscription requests 204. Alternatively or additionally, upon detecting an absence of event subscription requests to local events 206 that the local server application 104 is capable of detecting, the device 402 may temporarily or indefinitely end execution of the local server application 104. In this manner, the device 402 may operate the local server application 104 in an ad-hoc manner, and may otherwise conserve the resources of the device 402 when the local server application 104 is not in use.

As a second example of this fourth variation, respective processing components of the device 402 may be utilized only when local events 206 have been detected. For example, if the local event 206 comprises the processing of user input received through an input component the device 402 may withhold power from the processing component when such local events 206 are not arising. Moreover, such processing may be contingent upon the subscription of one or more client applications 108 to the local events 206 associated with the processing component. For example, if the device 402 comprises a processing component configured to interpret touch input received through a touch-sensitive display component, the device 402 may reduce or eliminate power provided to the processing component when the touch-sensitive display component is not receiving touch input, and, optionally, further contingent upon whether any client applications 108 are currently configured to receive and process touch input through the touch-sensitive display component. Such techniques may facilitate the conservation of device resources (such as power, processor, memory, and communications capacity) in accordance with the techniques presented herein. These and other variations of the subscription and execution of server scripts 202 may be utilized by the server application 104 on behalf of one or more client applications 108 in response to and associated with the detection of various local events 206 in accordance with the techniques presented herein.

E. Computing Environment

Figure 8:
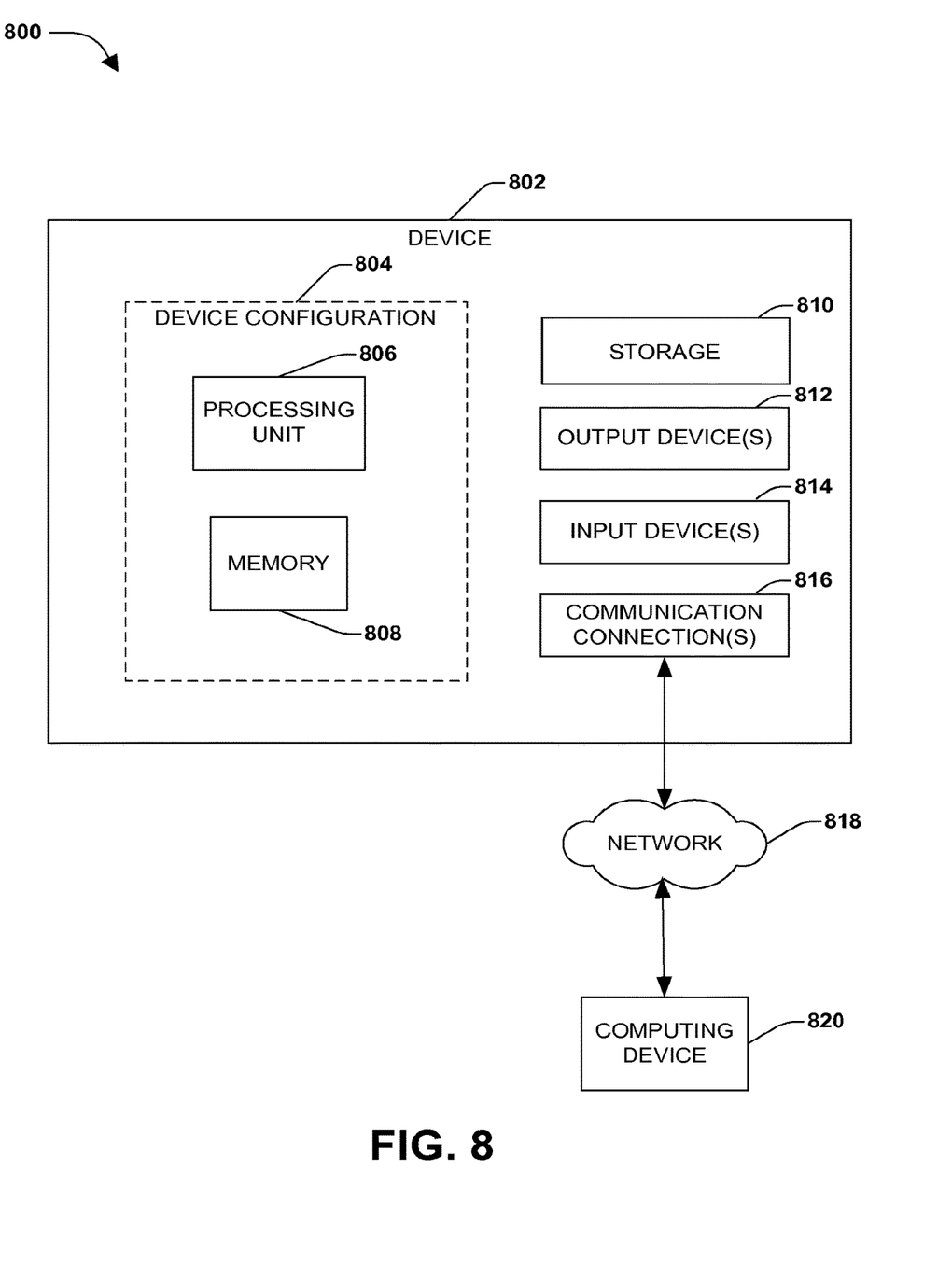
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
generating a local server associating server scripts with local events;
receiving from a local client application operating at the same device as the local server, a request to identify local events to which the local client application may subscribe, the request identifying a plurality of components accessible to the local client application;
for each component of the plurality of components, enumerating subscribable local events to which the local client application may subscribe;
upon receiving from the local client application a subscription request specifying a selected local event from the enumerated local events, associating the selected local event with the local client application; and
upon detecting the selected local event associated with at least one server script of the server scripts and the local client application, executing within the local server the at least one server script associated with the selected local event on behalf of the local client application.

2. The method of claim 1, wherein:
the local server comprises a webserver including a module comprising an asynchronous event driven JavaScript runtime environment that executes JavaScript code outside of a browser; and
the at least one server script comprises JavaScript that invokes the module on behalf of the local client application.

3. The method of claim 1, further comprising notifying the local client application of completion of the at least one server script, upon completion of the at least one server script.

4. The method of claim 1, further comprising adjusting execution of applications by the local server to conserve power, processing, and memory resources.

5. The method of claim 1, wherein:
the selected local event comprises a local application event arising during execution of a third application on the device; and
detecting the selected local event comprises monitoring the execution of the third application to detect the local application event.

6. A system for fulfilling requests on a device having a processor executing at least one local client application, the system comprising:
a local server component configured to associate server scripts with local events;
a local server binding component configured to:
upon receiving from the local client application a request to identify local events to which the local client application may subscribe, wherein the request identifies a plurality of components accessible to the local client application, for each component of the plurality of components, enumerate subscribable local events to which the local client application may subscribe;
upon receiving from the local client application a subscription request specifying a selected local event from the enumerated local events, associate the selected local event with the local client application; and
upon detecting the selected local event associated with at least one server script of the server scripts and the local client application, execute within the local server the at least one server script associated with and relating to the selected local event on behalf of the local client application.

7. The system of claim 6, wherein the local server binding component is further configured to, upon the local server achieving completion of the at least one server script associated with the selected local event, notify the local client application of the completion of the at least one server script in fulfillment of the server request.

8. The system of claim 7, wherein:
the at least one server script comprises at least one blocking request; and
the local server binding component is configured to execute the at least one server script by executing the at least one server script in a blockable thread within the local server.

9. The system of claim 8, wherein:
the at least one server script initiates a blocking request as an asynchronous process and provides a server script callback to be invoked upon achieving completion of the asynchronous process; and
the local server binding component is configured to execute the at least one server script by, upon achieving completion of the asynchronous process, invoking the server script callback of the at least one server script.

10. The system of claim 7, wherein:
the subscription request is received from the local client application including an application callback to the local client application to be invoked upon detecting the selected local event; and
the local server binding component is configured to notify the local client application by invoking the application callback provided by the local client application.

11. The system of claim 10, wherein:
the subscription request of the local client application is associated with a client user interface event; and
the local server binding component is further configured to, after receiving the subscription request and before detecting the selected local event associated with the subscription request, continue execution of the local client application including the client user interface event.

12. The method of claim 1, wherein enumerating the subscribable local events to which the local client application may subscribe includes providing a subscribable event enumeration identifying, for a component generating a local event, a component address that the local client application may specify to subscribe to the local event generated by the component.

13. The method of claim 1, further comprising upon receiving from the local client application the subscription request specifying the selected local event from the enumerated local events, generating the at least one server script.

14. A method of fulfilling requests on a device having a processor, the method comprising:
   executing, on the device, instructions configured to:
      generate a local server associating server scripts with local events;
      receive from a local client application operating at a same device as the local server, a request to identify local events to which the local client application may subscribe, the request identifying a plurality of components accessible to the local client application;
      for each component of the plurality of components, enumerate the local events to which the local client application may subscribe;
      upon receiving from the local client application a subscription request specifying a selected local event from the enumerated local events, associate the selected local event with the local client application; and
      upon detecting the selected local event associated with at least one server script of the server scripts and the local client application, execute within the local server the server script associated with and relating to the selected local event on behalf of the local client application.

15. The method of claim 14, wherein the instructions are further configured to:
   upon receiving a subscription request from a remote client application executing on a second device, associate the selected local event with the remote client application; and
   upon detecting the local event associated with the least one server script and the remote client application, execute within the local server the at least one server script associated with the selected local event on behalf of the remote client application.

16. The method of claim 14, wherein:
   the local server is responsive to subscription requests respectively specifying an address;
   respective local events are associated with a local event address; and
   receiving the subscription request from a client comprises receiving from the client application a subscription request specifying a local event address associated with the selected local event.

17. The method of claim 14, wherein the instructions are further configured to:
   conserve power resources of the device;
   conserve processing resources of the device; and
   conserve memory resources of the device.

18. The method of claim 14, wherein the instructions are further configured to:
   before detecting the selected local event, reducing power to at least one processing component of the device; and
   upon detecting the selected local event, restoring power to the at least one processing component.

19. The method of claim 18, wherein the restoring power to the at least one processing component comprises:
   upon detecting the selected local event, determining whether at least one subscription request is associated with the selected local event; and
   restoring power to the at least one processing component only upon identifying at least one subscription request associated with the selected local event.

20. The method of claim 14, wherein:
   the selected local event comprises a local application event arising during execution of a third application on the device; and
   detecting the selected local event comprises monitoring the execution of the third application to detect the local application event.

* * * * *